(12) United States Patent
Badillo

(10) Patent No.: US 7,396,030 B2
(45) Date of Patent: Jul. 8, 2008

(54) TOWING LOOP RETAINING DEVICE AND METHOD OF USING THE SAME TO PROVIDE A STEP

(75) Inventor: Paul Badillo, Littleton, CO (US)

(73) Assignee: Intelligent Designs 2000 Corp., Commerce City, CO (US)

(*) Notice: Subject to any disclaimer, the term of this patent is extended or adjusted under 35 U.S.C. 154(b) by 210 days.

(21) Appl. No.: 11/020,939

(22) Filed: Dec. 23, 2004

(65) Prior Publication Data

US 2005/0134018 A1    Jun. 23, 2005

Related U.S. Application Data

(60) Provisional application No. 60/532,508, filed on Dec. 23, 2003.

(51) Int. Cl.
*B60R 3/00* (2006.01)

(52) U.S. Cl. ............ 280/163; 280/166; 280/164.1

(58) Field of Classification Search ............ 280/163, 280/164.1, 166, 477, 495, 500, 502, 507, 280/727, 762; 296/62; 182/228.5
See application file for complete search history.

(56) References Cited

U.S. PATENT DOCUMENTS

| 2,653,036 | A  | * | 9/1953 | Creel et al. ............ 182/91 |
| 6,471,002 | B1 | * | 10/2002 | Weinerman ............ 182/91 |
| 6,840,526 | B2 | * | 1/2005 | Anderson et al. ........ 280/166 |

OTHER PUBLICATIONS

2003 Hummer H2 Owner's Manual, p. 5-31.

* cited by examiner

Primary Examiner—Christopher Ellis
Assistant Examiner—Katy Meyer
(74) Attorney, Agent, or Firm—Sheridan Ross P.C.

(57) ABSTRACT

The present invention is related to a device that is adapted for selective engagement with existing hardware on a vehicle to provide a step. More specifically, the present invention is a device that is engages a towing mechanism used on some sport utility and outdoor vehicles, such as the HUMMER® recovery loop that allows for interconnection with towing hardware, such as chains or straps. One embodiment of the present invention engages the loop to retain it in a generally horizontal orientation to thus provide a step that facilitates access to the roof of the vehicle that is often 5-7 feet from the ground.

11 Claims, 5 Drawing Sheets

TOWING LOOP RETAINING DEVICE AND METHOD OF USING THE SAME TO PROVIDE A STEP

This application claims the benefit of U.S. Provisional Patent Application Ser. No. 60/532,508, filed Dec. 23, 2003, which is incorporated by reference in its entirety herein.

FIELD OF THE INVENTION

The present invention relates to a device adapted for selective engagement with a towing loop of a vehicle to provide a step. More specifically, one embodiment of the present invention engages the recovery loop employed by many off-road and sport utility vehicles, thus providing a step that allows a user to access the upper portions of the vehicle.

BACKGROUND OF THE INVENTION

Off-road and sport utility vehicles have increasingly become a common mode of transportation. These vehicles usually have a very high ground clearance to allow them to traverse rough terrain and road debris. As a result, the roofs of these vehicles are often 5-7 feet from the ground, thereby making access to the roof and roof racks thereon very difficult. Often, the only way to access the upper portions of sports utility vehicles is to open the door and use the interior as a step. One drawback of this method is that the user's orientation with respect to the roof rack is precarious, such that they are often situated too close to the vehicle to effectively gain access to the roof rack. Another method is to use the bumpers of the vehicle as steps. Often, however, after using the vehicle in an off-road manner, the bumpers are often muddy and slick, thereby potentially causing injury to one who attempts to use them as footholds.

Some automobile manufacturers, such as HUMMER®, provide steps for access to their vehicles' extremely high roofs. However, the steps provided are usually three feet from the ground and are difficult to access by shorter individuals. In addition, some manufacturers provide steps that are adapted to selectively interconnect to trailer hitches. The major drawback of these steps is that they interconnect to the vehicle in the rear center of the vehicle where the spare tire is usually positioned, thus the access to the roof is limited.

Thus, there is a long felt need in the field of sport utility vehicle manufacturing to provide a step that provides the user with greater access to the higher portions of the vehicle. The following disclosure describes a mechanism that selectively interconnects with existing hardware of some sport utility vehicles to create a safe stepping surface.

SUMMARY OF THE INVENTION

It is thus one aspect of the present invention to provide a device for retaining a towing loop that is found on some off-road vehicles, thus providing a step. More specifically, one embodiment of the present invention is adapted to interconnect with the existing towing hardware provided by automobile manufacturers and which allows that hardware to become a step to provide increased access to the upper portions of the vehicle. The device in one embodiment of the present invention includes a base member, which is adapted to interconnect with the existing towing hardware, and a retaining member, which is rotatably interconnected to the base member. "Hardware" as used herein, generally refers to a towing loop that is employed by many automobile manufacturers to provide an engagement location for towing apparatus, such as chains or straps. For example, Hummer® employs a plurality of "recovery loops" to aid in vehicle extraction from steep inclines, ditches, bogs, etc. The towing loops are rotated upward and placed in contact with the retaining member of the present invention, thus providing a rigid step to enable a user to gain access to the upper portions of the vehicle safely and easily. It is envisioned that one embodiment of the present invention be interconnected to the existing hardware provided by vehicle manufacturers using the fasteners provided therewith, thus decreasing costs to the consumer. Alternatively, another embodiment of the present invention is permanently interconnected to the towing hardware provided by manufacturers, for example by welding. This option is envisioned to be supplied by the vehicle manufacturers at delivery. Although the foregoing has been concerned with a device that rotates to provide a surface that retains the towing loop in a substantially horizontal orientation, one skilled in the art will appreciate that any number of mechanisms may be added to, or integrated directly onto, the towing loop apparatus to retain the towing loop. For example, deployable braces or gussets may be employed to retain the towing loop so it can be used as a step. Alternatively, a ratchet mechanism may be employed.

It is another aspect of the present invention to provide a device with at least two stepping options. More specifically, as described above, the towing loop may be used as a step, wherein the loop retaining member is used to support the towing loop to form the step. Alternatively, one embodiment of the present invention employs an upper surface that may be used as a secondary stepping location. Related embodiments of the present invention include a knurled area on an upper surface of the loop retention system or rubberized materials glued or otherwise attached thereto to increase traction.

It is yet another aspect of the present invention to provide a device that retains towing loops of off-road vehicles to provide a step that is constructed of common materials, and is thus cost effective to manufacture. More specifically, one embodiment of the present invention is constructed of two pieces of machined metal, such as aluminum or stainless steel. These materials are both inexpensive to machine and are corrosion resistant, which is advantageous to the user. The two halves of the device, a base member and a loop retaining member, are rotatably interconnected by a pin that allows free rotation of the loop retaining member while preventing translational motion.

It is still yet another aspect of the present invention to provide a device for selectively engaging and holding a towing loop that is easily installed and deployed. More specifically, one embodiment of the present invention is adapted for interconnection with existing hardware of the vehicle, for example with fasteners that are used to attach the towing loop mechanism to the vehicle, thereby reducing costs to the user. In addition, one embodiment of the present invention is adapted to easily and quickly deploy when the towing loop is in an upward position. Thus, one embodiment of the present invention may be deployed with one hand, which is advantageous to those carrying items that they do not wish to rest on the ground.

It is another aspect of the present invention to provide a towing loop retaining device integrated directly onto the vehicle. More specifically, one embodiment includes a device for selectively engaging and holding the towing loop that is integrated onto the vehicle or bracket that secures the towing loop. The base member may be omitted in this embodiment wherein the loop retaining member is pivotably interconnected onto the existing towing hardware and/or vehicle.

One skilled in the art will appreciate that any towing loop retention device that supports the vehicle towing loop may be provided without departing from the scope of the invention. More specifically, a retention pin may be provided that engages the towing loop to form a step. Alternatively, a ratcheting mechanism may be provided that selectively engages the towing loop to form a step. Generally, any device or member that interfaces with the vehicle towing loop is contemplated that supports the towing loop in a second position to provide a foot hold.

Thus, it is one aspect of the present invention to provide a device adapted to selectively retain a vehicle towing loop to provide a step, the towing loop being rotatably interconnected to an attachment member that is interconnected to the vehicle, comprising:

a base member having an upper surface, a lower surface, a front surface, a rear surface, a left surface, a right surface and a plurality of countersunk apertures integrated into said front surface, said apertures adapted to receive fasteners that are employed to interconnect the attachment member to the vehicle;

a support member, with a left surface and a right surface, rotatably interconnected to said front surface of said base member between said upper surface and said lower surface, said support member having a first and second position of use; and wherein said left surface of said support member is generally perpendicular to the surface supporting the vehicle when said support member is in said first position of use, and wherein said left surface of said support member is generally parallel to the surface supporting the vehicle when said support member is in said second position of use, thereby providing a platform for engaging and rigidly supporting the towing loop.

The Summary of the Invention is neither intended nor should it be construed as being representative of the full extent and scope of the present invention. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these embodiments.

Figure 1:
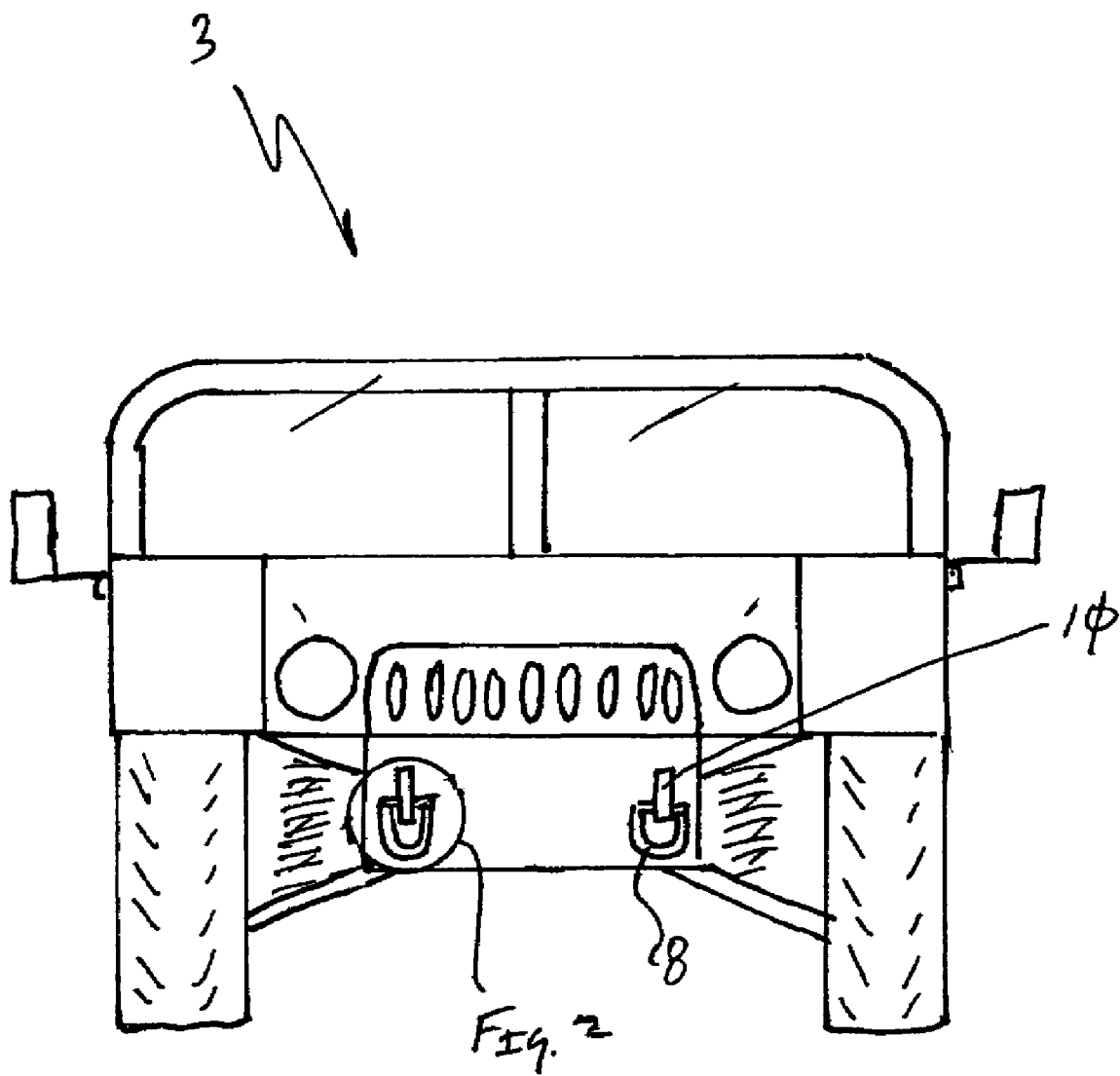
FIG. 1 is a towing loop used in conjunction with one embodiment of the present invention.

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

To assist in the understanding of the present invention the following list of components and associated numbering found in the drawings is provided herein:

| Component | # |
| --- | --- |
| Towing loop retaining device | 2 |
| Vehicle | 3 |
| Base member | 4 |
| Loop retention member | 6 |
| Towing loop | 8 |
| Towing loop attachment member | 10 |
| Fastener | 12 |
| Pin | 14 |
| Secondary step | 16 |
| Upper surface | 18 |
| Recess | 20 |
| Fastener aperture | 22 |
| Engagement surface | 24 |

DETAILED DESCRIPTION.

Referring now to FIGS. 1-9, a towing loop retaining device 2 that provides a step that enhances access to upper regions of a vehicle 3 is shown. More specifically, one embodiment of the present invention includes a base member 4 with a loop retention member 6 rotatably interconnected thereto. The device 2 is adapted for selective engagement with a towing loop 8 employed on many off-road vehicles. The towing loop 8 includes a towing loop attachment member 10 interconnected to the vehicle 3 that provides two locations that rotatably accept a u-shaped member. The u-shaped member is capable of rotation from a down position when not in use to a position substantially parallel to a longitudinal axis of the vehicle 3 during use to provide a location for interconnection of towing apparatus such as cables, chains, or nylon straps. Often, the loops 8 are used to aid in the extraction of the vehicle when it is stuck in a gully or a ditch.

Referring now to FIG. 1, the towing loop that is employed in conjunction with one embodiment of the present invention is shown. More specifically, many off-road or sport utility vehicles employ a plurality of loops 8 that aid in the extraction of the vehicle when it is stuck. The loops 8 are usually capable of at least two positions of use due to its hinged interconnection to a loop attachment member 10.

Figure 2:
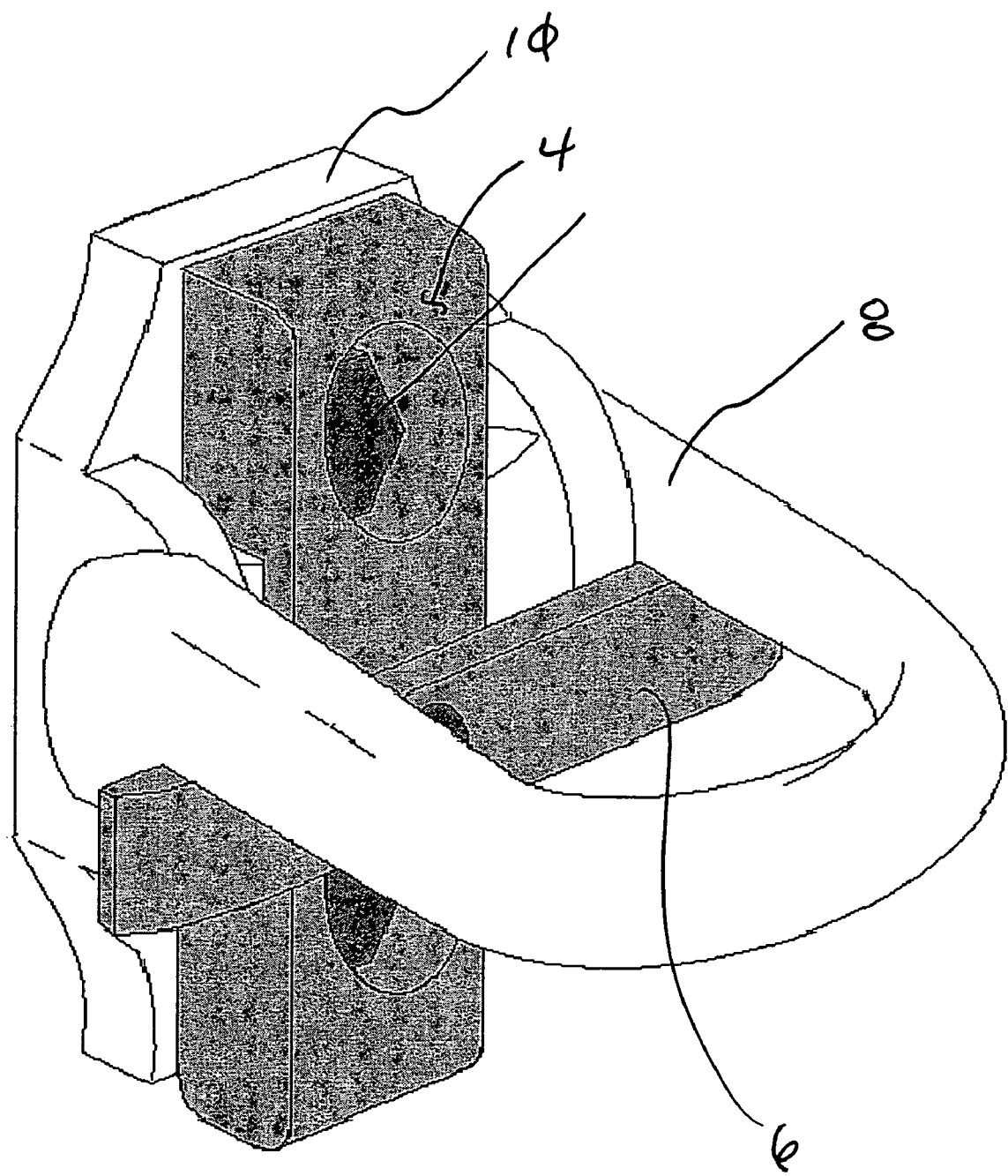
FIG. 2 is a front perspective view showing the present invention engaged to the towing loop, providing a step.

Referring now to FIG. 2, one embodiment of the present invention is shown engaged with a towing loop 8. Generally, the towing loop mechanism consists of a towing loop attachment member 10 with a rotatably interconnected towing loop 8. Commonly, the towing loop attachment member 10 is a plate that is adapted for interconnection with the vehicle that provides two pivot points. The towing loop 8 is generally u-shaped member that is rotatably connected to the pivot points of the towing loop attachment member 10.

One embodiment of the present invention consists of the base member 4, which is adapted for interconnection to the towing loop attachment member 10, and a loop retention member 6, which is rotatably interconnected to the base member 4. As shown herein, the base member 4 is attached to the towing loop attachment member 10 with fasteners 12, such as bolts, that are generally used to interconnect the towing loop attachment member 10 to the vehicle. However, it is envisioned that depending on the thickness of the base member 4, the fasteners 12 may be lengthened to provide sufficient structural stability. The loop retention member 6 is rotatably interconnected to the base member 4 by way of a fastener, preferably, in one embodiment of the present invention, a pin 14 that allows free rotation of the loop retention member 6. In operation, the towing loop 8 is extended outwardly and the loop retention member 6 is rotated into place such that a surface is provided to retain the towing loop 8, thus providing a stepping surface. Retaining loops are often employed by vehicles manufactured by HUMMER® and are also found on many other types of off-road vehicles.

Figure 3:
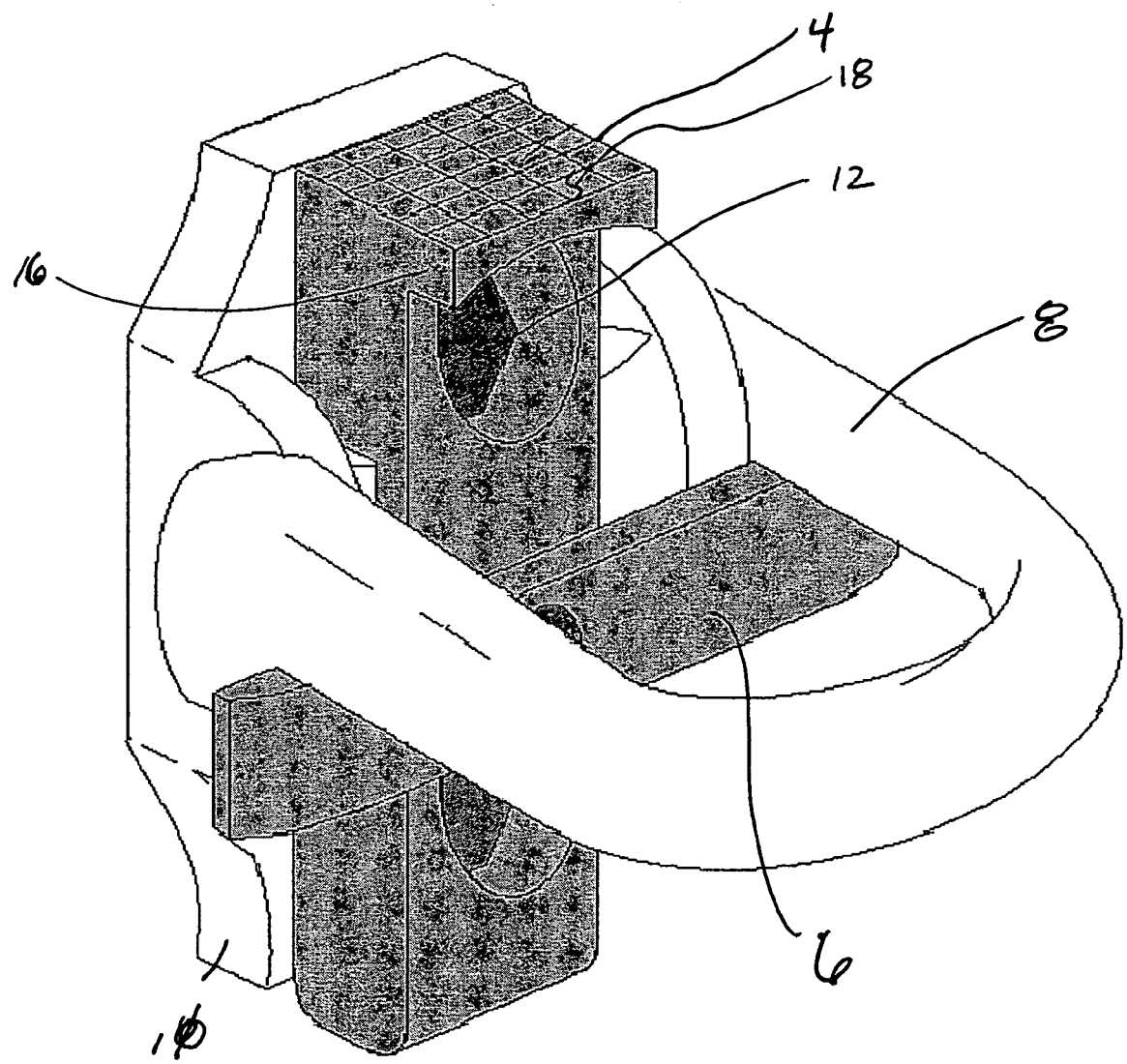
FIG. 3 is a front perspective view of another embodiment of the present invention that includes a base member with a knurled upper surface to provide a secondary step.

Referring now to FIG. 3, another embodiment of the present invention is shown that employs a secondary step 16 for quick access to the vehicle's roof. More specifically, this embodiment of the present invention includes an extended upper surface 18 wherein a secondary step 16 is provided when the loop retention member 6 is not deployed for use. It is envisioned that this step 16 may provide a user quick access to the top of the vehicle without having to deploy the loop retention member 6. As shown herein, a knurled surface may be to provide additional traction. In addition, other materials may be affixed to the top surface 18 of the base member 4 to provide added traction, such as a rubber tread.

Figure 4:
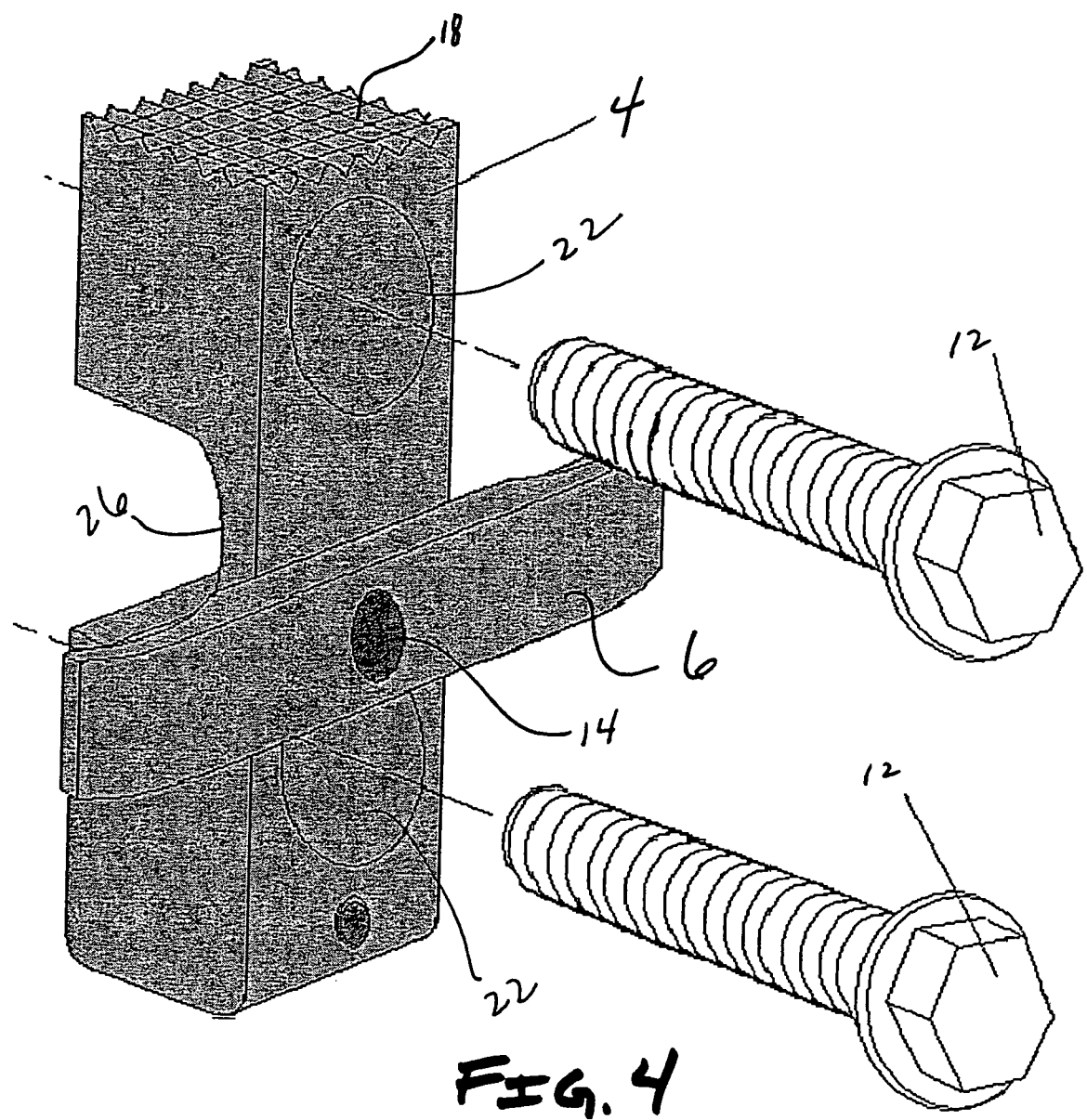
FIG. 4 is a front perspective view of another embodiment of the present invention showing a recess that provides a snug fit to the vehicle hardware.
Figure 5:
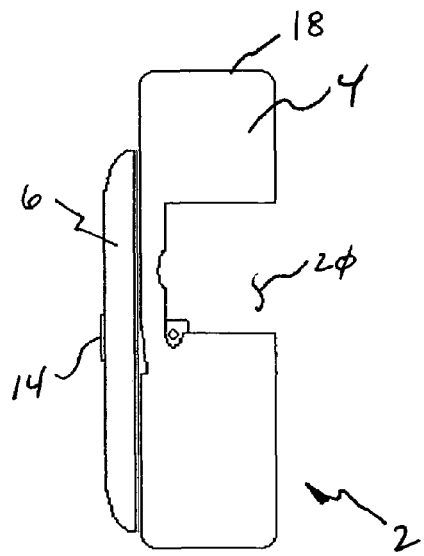
FIG. 5 is a right elevation view of one embodiment of the present invention.
Figure 6:
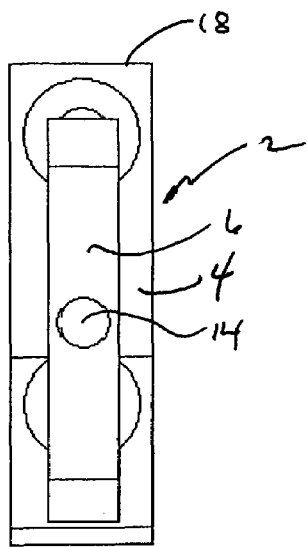
FIG. 6 is a front elevation view of the embodiment of the present invention shown in FIG. 5.
Figure 7:
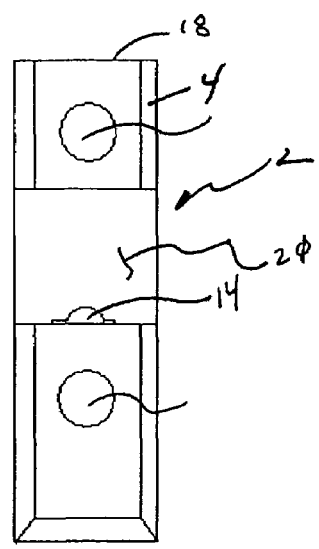
FIG. 7 is a rear elevation view of the present invention shown in FIG. 5.
Figure 8:
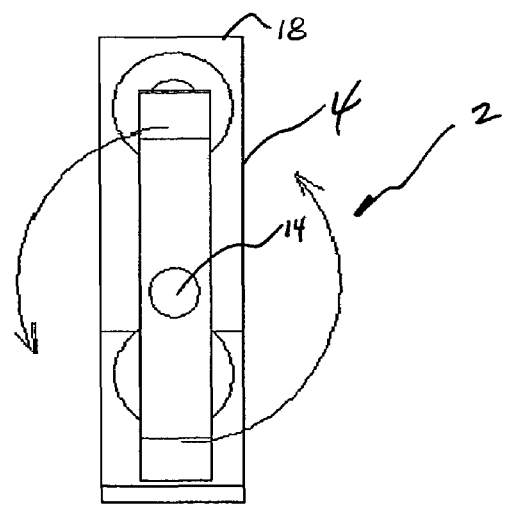
FIG. 8 is a front elevation view of the present invention shown in FIG. 5, wherein a loop retention member is shown in the first position prior to deployment.
Figure 9:
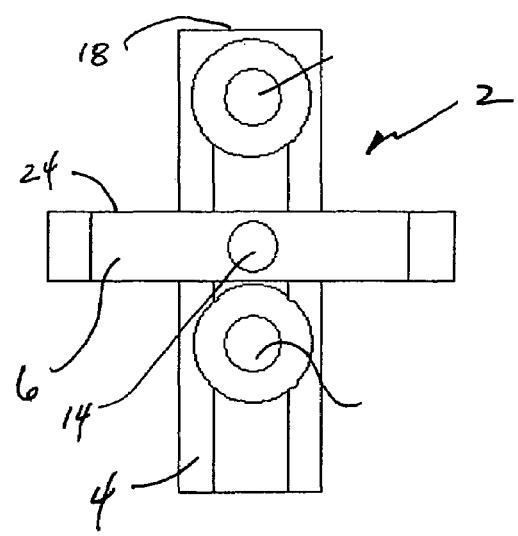
FIG. 9 is a front elevation view of the present invention shown in FIG. 5, wherein the loop retention member is shown in a second deployed position such that a surface is provided for an engagement with the loop of the vehicle hardware, thus providing a step.

Referring now to FIG. 4, the method of attaching the base member 4 to the loop attachment member 10 is shown. More specifically, one embodiment of the base member 4 of the present invention is constructed from machined stainless steel or aluminum to provide fastener apertures 22. In addition, this embodiment of the present invention may include at least one recess 26 that receives a portion of the towing loop attachment member 10 to provide a snug fit. One skilled in the art will appreciate that any number of recesses may be machined into the base member 4 to provide clearance to accommodate protrusions of the towing loop attachment mechanism 10. As also shown herein, the loop retention member 6, which is rotatably interconnected to the base member 4, with a pin 14, is a generally rectangular piece of aluminum or stainless steel. It will be appreciated by one skilled in the art that the components of the present invention may also be constructed out of any rigid material that is capable of supporting a predetermined weight. For example, carbon fiber composites or stiff plastics may also be employed. It is also one aspect of the invention to provide materials that are compatible with the factory supplied towing loops 8 and that are corrosion resistant. Finally, as shown herein, fasteners 12, such as bolts, are used to interconnect the base member 4 to the loop attachment member 10. In one embodiment of the present invention, the apertures 22 include countersinks to provide engagement locations for the heads of the fasteners 22 to provide a structurally stable support for the base member 4.

Referring now to FIGS. 5-9, a method of using one embodiment of the present invention is shown. Initially, the loop retention member 6 is oriented such that it is substantially in line with the axis base member 4, thus allowing the towing loop 8 to be rotated at about 180° from its downward position to a substantially upward position. Once the towing loop 8 is in an upward position, the loop retention member 6 is then rotated approximately 90° to provide a surface 24 that the towing loop 8 may rest. Once the loop retention member 6 is in the substantially horizontal second position, the towing loop 8 is released and allowed to rest on the loop retention member 6, thus providing a substantially horizontal step that aids the user in gaining access to upper portions of the vehicle.

While various embodiment of the present invention have been described in detail, it is apparent that modifications and adaptations of those embodiments will occur to those skilled in the art. However, it is to be expressly understood that such modifications and adaptations are within the scope and spirit of the present invention, as set forth in the following claims.

What is claimed is:

1. A device adapted to selectively retain a vehicle towing loop to provide a step, the towing loop being rotatably interconnected to an attachment member that is interconnected to the vehicle, comprising:

a base member having an upper surface, a lower surface, a front surface, a rear surface, a left surface, a right surface and a plurality of countersunk apertures integrated into said front surface, said apertures adapted to receive fasteners that are employed to interconnect the attachment member to the vehicle;

a support member, with a left surface and a right surface, rotatably interconnected to said front surface of said base member between said upper surface and said lower surface, said support member having a first and second position of use; and wherein said left surface of said support member is generally perpendicular to the surface supporting the vehicle when said support member is in said first position of use, and wherein said left surface of said support member is generally parallel to the surface supporting the vehicle when said support member is in said second position of use, thereby providing a platform for engaging and rigidly supporting the towing loop.

2. The device of claim 1, wherein said base member and said support member are generally rectangular members constructed of at least one of an aluminum, a steel, a carbon fiber composite, a plastic, a rubber, a wood, and an iron.

3. The device of claim 1, wherein said upper surface of said base member includes a knurled finish.

4. The device of claim 1, wherein said upper surface of said base member includes a substantially non-slip material interconnected thereto.

5. The device of claim 1, wherein said upper surface of said base member has an area greater to the area of said bottom surface of said base member to provide a secondary step.

6. The device of claim 1, wherein said rear surface of said base member includes a recess integrated therein that accommodates protrusions of the attachment mechanism.

7. A device adapted to selectively retain a vehicle towing loop to provide a step, the towing loop being rotatably interconnected to an attachment member that is interconnected to the vehicle, comprising:

a base member with an aperture for receiving a bolt that secures the attachment member to the vehicle adapted for interconnect to the attachment member;

a loop retention member rotatably interconnected to said base member, said loop retention member having a first position and a second position; and wherein when said loop retention member is in said second position, a surface is provided that is adapted to selectively engage the towing loop thereby supporting it in a generally horizontal plane to form a step.

8. The device of claim 7, wherein said base member and said loop retention member are generally rectangular members constructed of at least one of an aluminum, a steel, a carbon fiber composite, a plastic, a rubber, a wood, and an iron.

9. The device of claim 7, said base member includes an upper surface with a knurled finish.

10. The device of claim 7, wherein said base member includes a substantially non-slip material interconnected to an upper surface thereof.

11. The device of claim 7, wherein an upper surface of said base member has an area greater to the area of a bottom surface of said base member to provide a secondary step.

* * * * *